United States Patent
Fukawatase et al.

(10) Patent No.: US 11,357,677 B2
(45) Date of Patent: Jun. 14, 2022

(54) SHARED VEHICLE

(71) Applicant: Toyota Jidosha Kabushiki Kaisha, Toyota (JP)

(72) Inventors: Osamu Fukawatase, Miyoshi (JP); Fumiko Nakai, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 105 days.

(21) Appl. No.: 16/893,824

(22) Filed: Jun. 5, 2020

(65) Prior Publication Data

US 2021/0038447 A1 Feb. 11, 2021

(30) Foreign Application Priority Data

Aug. 8, 2019 (JP) .............................. JP2019-146761

(51) Int. Cl.
*A61G 3/08* (2006.01)
*B62D 25/04* (2006.01)
*B62D 31/00* (2006.01)

(52) U.S. Cl.
CPC ............ *A61G 3/0808* (2013.01); *B62D 25/04* (2013.01); *B62D 31/003* (2013.01)

(58) Field of Classification Search
CPC ................................. A61G 3/08; A61G 3/0808
USPC ...................................................... 296/65.04
See application file for complete search history.

(56) References Cited

U.S. PATENT DOCUMENTS

| 8,911,188 B1 * | 12/2014 | Mill ........................ B60N 2/245 410/23 |
| 2009/0255437 A1 * | 10/2009 | Hachet ...................... B61D 1/00 105/344 |
| 2017/0240214 A1 | 8/2017 | Pelletier et al. |
| 2020/0093662 A1 | 3/2020 | Mori |

FOREIGN PATENT DOCUMENTS

| DE | 29721944 U1 | 5/1998 | |
| JP | 2001-047969 A | 2/2001 | |
| JP | WO2002030704 A1 * | 2/2004 | ............. A61G 3/062 |
| JP | 2015-085068 A | 5/2015 | |
| JP | 2018-090143 A | 6/2018 | |
| JP | 2020-050103 A | 4/2020 | |

* cited by examiner

*Primary Examiner* — Dennis H Pedder
(74) *Attorney, Agent, or Firm* — Dinsmore & Shohl LLP

(57) ABSTRACT

A shared vehicle includes: a pair of right and left first pillars; a pair of right and left fourth pillars; a pair of right and left second pillars; a pair of right and left third pillars; an entrance door provided on one side wall of a vehicle body so as to be placed between the second pillar and the third pillar; and a front wheelchair space being provided such that at least a head of a wheelchair occupant is placed within a first region of the vehicle cabin in a plan view, the first region being surrounded by the first pillars and the second pillars, or a rear wheelchair space being provided such that at least the head of the wheelchair occupant is placed within a second region of the vehicle cabin in a plan view, the second region being surrounded by the third pillars and the fourth pillars.

15 Claims, 7 Drawing Sheets

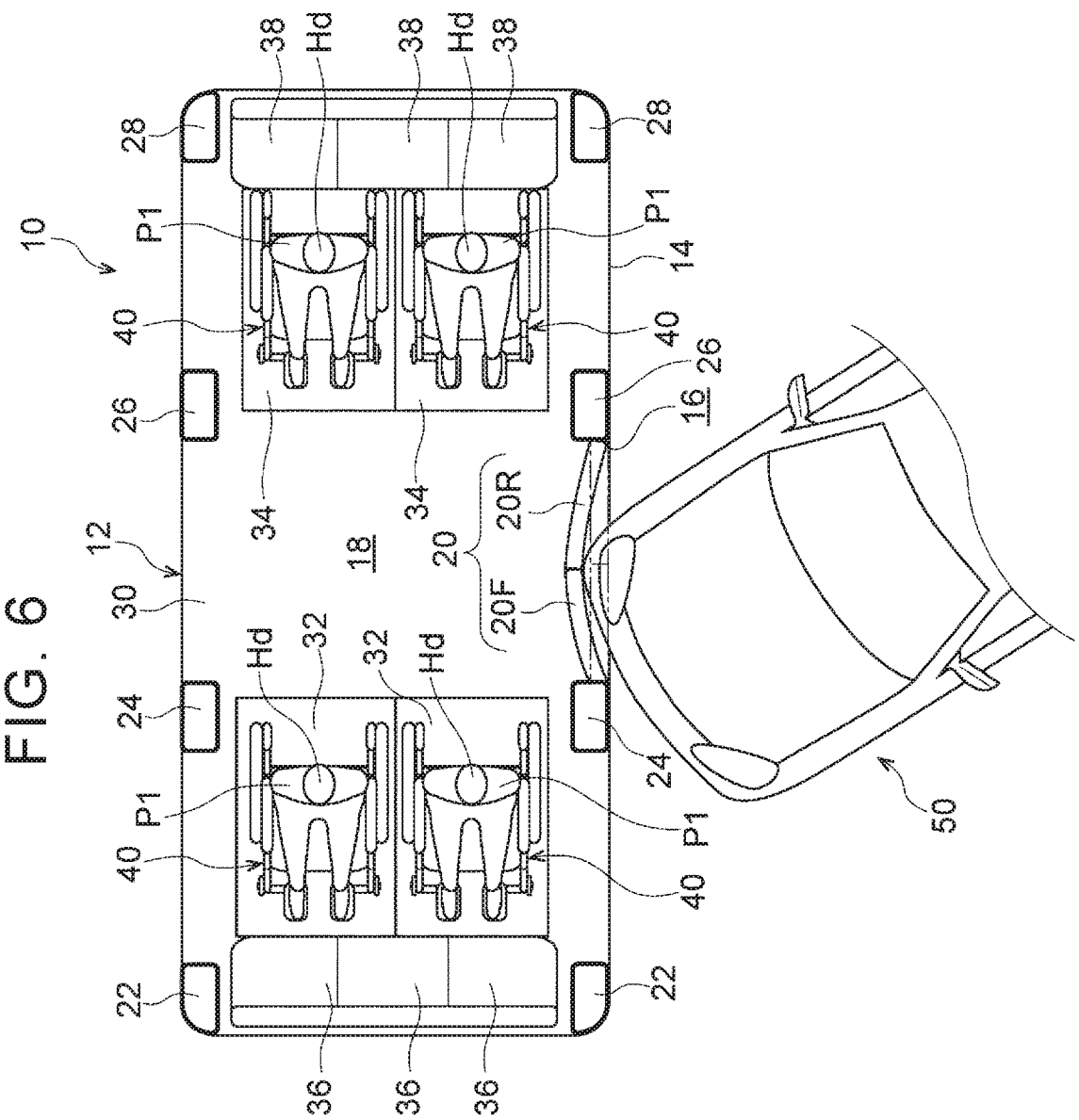

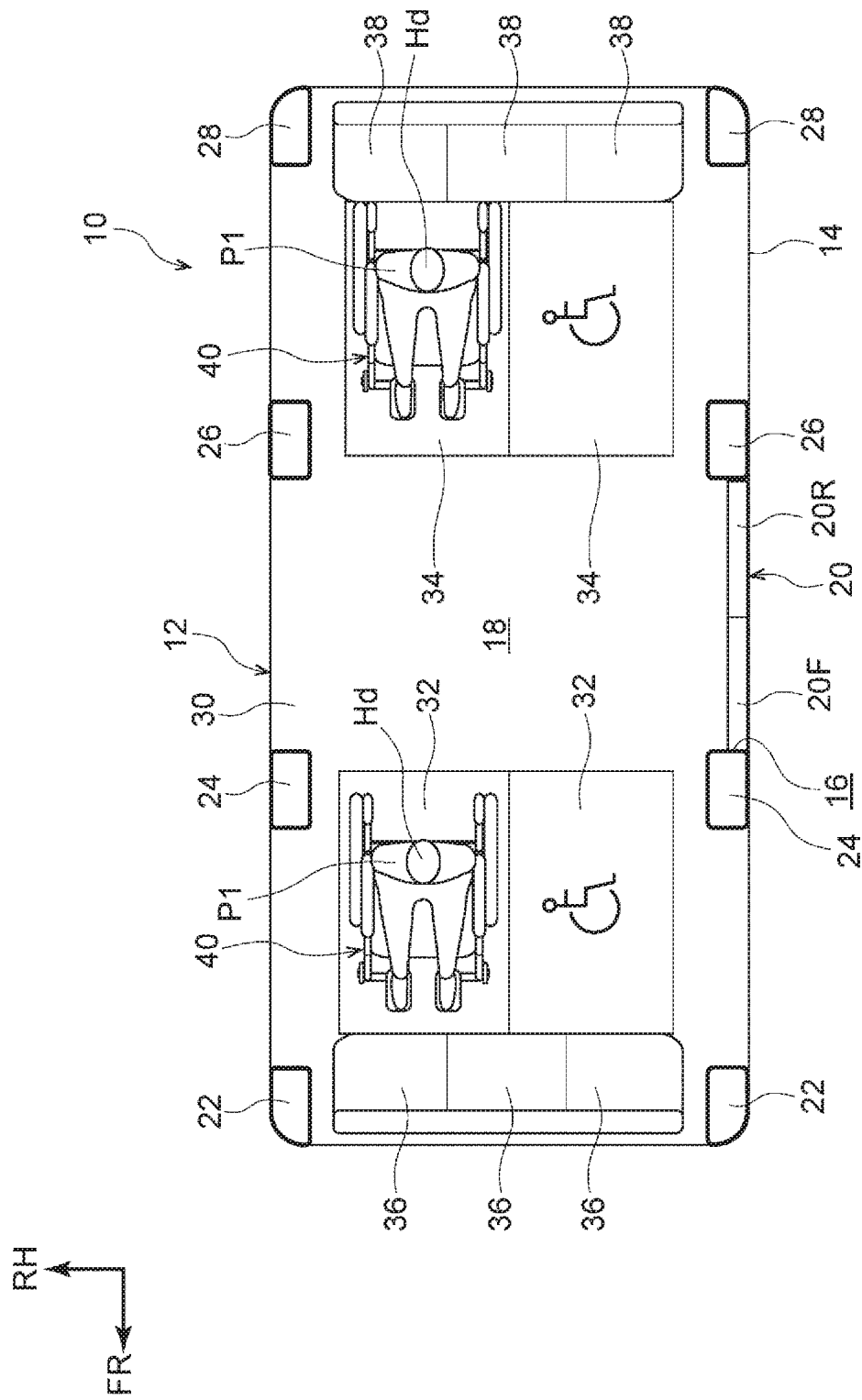

SHARED VEHICLE

CROSS-REFERENCE TO RELATED APPLICATIONS

This application claims priority to Japanese Patent Application No. 2019-146761 filed on Aug. 8, 2019, which is incorporated herein by reference in its entirety including the specification, drawings and abstract.

BACKGROUND

1. Technical Field

The present disclosure relates to a shared vehicle that can protect a wheelchair occupant even when the shared vehicle has a side collision.

2. Description of Related Art

There has been known a bus configured such that, when a foldable seat on a right side wall side where no entrance door is provided is folded and a space is formed, one wheelchair in a facing forward posture can be fixed on each of the front side and the rear side in the space (e.g., see Japanese Unexamined Patent Application Publication No. 2015-85068 (JP 2015-85068A)). In this bus, the entrance door is provided on a left side wall overlapping a region where at least the wheelchair on the rear side is fixed, in a side view of the bus viewed from the vehicle width direction.

SUMMARY

Generally, an entrance door provided on one side wall of a bus is upsized for convenience. On that account, a pillar cannot be set in a doorway where the entrance door is provided. Accordingly, when the bus has a side collision such that another vehicle or the like collides with the entrance door of the bus, such a situation is considered that the entrance door largely deforms inward in a vehicle cabin.

That is, like the bus described above, when a region where a wheelchair is fixed is provided at a position overlapping with the entrance door in a side view, the entrance door deforms toward the wheelchair. As such, in terms of the bus in which the entrance door is provided on one side wall, it is hard to say that a boarding position for a wheelchair occupant is set to a position determined in consideration of occurrence of a side collision. Thus, there is room for improvement in this respect.

The present disclosure provides a shared vehicle that can protect a wheelchair occupant when the shared vehicle has a side collision.

A shared vehicle according to a first aspect of the present disclosure includes a pair of right and left first pillars, a pair of right and left fourth pillars, a pair of right and left second pillars, a pair of right and left third pillars, an entrance door, and a front wheelchair space and/or a rear wheelchair space. The right and left first pillars are provided in a front portion of a vehicle body in the front-and-rear direction of the vehicle body, the first pillars extending in the up-and-down direction of the vehicle body. The right and left fourth pillars are provided in a rear portion of the vehicle body in the front-and-rear direction of the vehicle body, the fourth pillars extending in the up-and-down direction of the vehicle body. The right and left second pillars are provided behind the first pillars in the front-and-rear direction of the vehicle body and in front of the fourth pillars in the front-and-rear direction of the vehicle body, the second pillars extending in the up-and-down direction of the vehicle body. The right and left third pillars are provided in front of the fourth pillars in the front-and-rear direction of the vehicle body and behind the second pillars in the front-and-rear direction of the vehicle body, the third pillars extending in the up-and-down direction of the vehicle body. The entrance door is provided on one side wall of the vehicle body and placed between the second pillar and the third pillar. The front wheelchair space is on a floor face of a vehicle cabin, the front wheelchair space being provided such that at least the head of a wheelchair occupant is placed within a first region of the vehicle cabin in a plan view, the first region being surrounded by the right and left first pillars and the right and left second pillars. The rear wheelchair space is on the floor face of the vehicle cabin, the rear wheelchair space being provided such that at least the head of the wheelchair occupant is placed within a second region of the vehicle cabin in a plan view, the second region being surrounded by the right and left third pillars and the right and left fourth pillars.

In the above first aspect, the shared vehicle may include the front wheelchair space and the rear wheel chair space.

With the above configuration, in a plan view, at least the head of the wheelchair occupant seated in the front wheelchair space on the floor face of the vehicle cabin is placed within the region, of the vehicle cabin, that is surrounded by the right and left first pillars and the right and left second pillars. Further, in a plan view, at least the head of the wheelchair occupant seated in the rear wheelchair space on the floor face of the vehicle cabin is placed within the region, of the vehicle cabin, that is surrounded by the right and left third pillars and the right and left fourth pillars.

Here, the region, of the vehicle cabin, that is surrounded by the right and left first pillars and the right and left second pillars and the region, of the vehicle cabin, that is surrounded by the right and left third pillars and the right and left fourth pillars are high-strength regions. Accordingly, even when the shared vehicle has a side collision, the wheelchair occupant at least the head of whom is placed within the high-strength region can be hardly affected by deformation of the vehicle body. That is, with the present disclosure, even when the shared vehicle has a side collision, the wheelchair occupants on the shared vehicle are protected.

Note that the "shared vehicle" in the present disclosure indicates a general shared vehicle that can travel with a plurality of people being carried by the shared vehicle regardless of whether they need to pay the fare or not. A vehicle for so-called mobility as a service (MaaS) including a self-driving bus or the like as an example is also included in the "shared vehicle" in the present disclosure.

In the above aspect, a distance in the front-and-rear direction of the vehicle body between the second pillar and the third pillar may be wider than a distance in the front-and-rear direction of the vehicle body between the first pillar and the second pillar in a side view. The distance in the front-and-rear direction of the vehicle body between the second pillar and the third pillar may be wider than a distance in the front-and-rear direction of the vehicle body between the third pillar and the fourth pillar in a side view.

With the above configuration, the width, in the vehicle body front-and-rear direction, of the entrance door (a doorway) provided between the second pillar and the third pillar can be made wide. This accordingly allows the wheelchair occupant to easily get on and off the share vehicle, so that a burden to the wheelchair occupant at the time of getting on and off the shared vehicle is reduced.

In the above aspect, a wheelchair of the wheelchair occupant seated in the rear wheelchair space in a forward facing posture may be fixable to a rear wall side of the vehicle cabin.

In the above aspect, a wheelchair of the wheelchair occupant seated in the front wheelchair space in a rearward facing posture may be fixable to a front wall side of the vehicle cabin.

With the above configuration, at least the head of the wheelchair occupant seated in the rear wheelchair space in a forward facing posture and the head of the wheelchair occupant seated in the front wheelchair space in a rearward facing posture can be easily placed within respective high-strength regions. Further, at the time of getting off the shared vehicle, the wheelchair occupant seated in the rear wheelchair space in a forward facing posture and the wheelchair occupant seated in the front wheelchair space in a rearward facing posture can operate their wheelchairs in a forward facing posture. This improves convenience for the wheelchair occupants.

In the above aspect, a wheelchair of the wheelchair occupant seated in the front wheelchair space in a forward facing posture may be fixable to a front wall side of the vehicle cabin.

In the above aspect, the shared vehicle may include a seat provided on a rear wall side of the vehicle cabin such that an occupant is seated on the seat in a semi-upright posture. The wheelchair of the wheelchair occupant seated in the rear wheelchair space in a forward facing posture may be fixable to the seat.

With the above configuration, at least the head of the wheelchair occupant seated in the rear wheelchair space in a forward facing posture can be easily placed within the high-strength region.

In the above aspect, the shared vehicle may include a seat provided on a front wall side of the vehicle cabin such that an occupant is seated on the seat in a semi-upright posture. The wheelchair of the wheelchair occupant seated in the front wheelchair space in a rearward facing posture may be fixable to the seat.

In the above aspect, the shared vehicle may include a seat provided on a front wall side of the vehicle cabin such that an occupant is seated on the seat in a semi-upright posture. The wheelchair of the wheelchair occupant seated in the front wheelchair space in a forward facing posture may be fixable to the seat.

In the above aspect, the seat may include a seating face on which the occupant is seated, and a positioning portion. The positioning portion may be configured such that, when a part of the wheelchair is brought into contact with the positioning portion, the wheelchair is placed in the rear wheelchair space in a fixed state.

In the above aspect, the seat may include a seating face on which the occupant is seated, and a positioning portion. The positioning portion may be configured such that, when a part of the wheelchair is brought into contact with the positioning portion, the wheelchair is placed in the front wheelchair space in a fixed state.

With each aspect of the present disclosure, even when the shared vehicle has a side collision, a wheelchair occupant on the shared vehicle can be protected.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a plan view illustrating a case where the bus according to the present embodiment has a side collision from an entrance door side; and FIG. 7 is a plan view illustrating a case where one wheelchair occupant is seated on each of the front side and the rear side inside the bus according to the present embodiment in a forward facing posture.

DETAILED DESCRIPTION OF EMBODIMENTS

The following describes an embodiment of the present disclosure in detail with reference to the drawings. Note that, for convenience of description, in each of the drawings, an arrow UP indicates the up direction of the vehicle body, an arrow FR indicates the front direction of the vehicle-body front-and-rear, and an arrow RH indicates the right direction of the vehicle body. Accordingly, in the following description, when an up-and-down direction, a front-and-rear direction, and a right-and-left direction are described without any special mention, they respectively indicate an up-and-down direction of the vehicle body, a front-and-rear direction of the vehicle body front-and-rear direction, and a right-and-left direction of the vehicle body (the vehicle width direction). Further, a view from the vehicle width direction is referred to as a "side view." Further, the present embodiment is described based on a self-driving bus (hereinafter just referred to as a "bus") 10 taken as an example of a shared vehicle.

Figure 1:
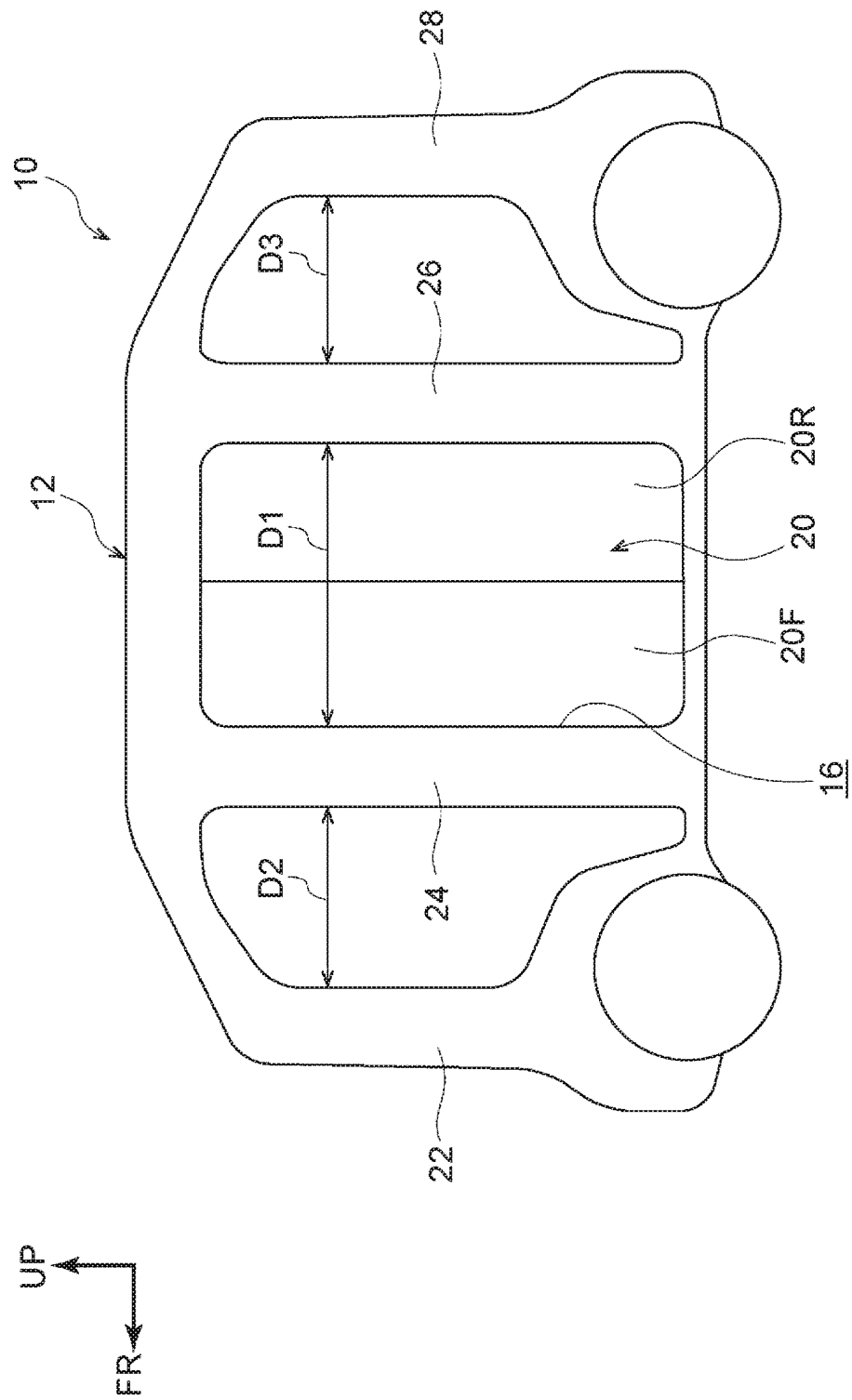
FIG. 1 is a side view illustrating a bus according to the present embodiment.

As illustrated in FIG. 1, the bus 10 includes a pair of right and left first pillars 22, a pair of right and left fourth pillars 28, a pair of right and left second pillars 24, and a pair of right and left third pillars 26. The first pillars 22 are provided in a front portion (a front end portion) of a vehicle body 12 in the front-and-rear direction such that the first pillars 22 extend in the up-and-down direction. The fourth pillars 28 are provided in a rear portion (a rear end portion) of the vehicle body 12 in the front-and-rear direction such that the fourth pillars 28 extend in the up-and-down direction. The second pillars 24 are provided behind the first pillars 22 and in front of the fourth pillars 28 (more specifically, the third pillars 26 (described later)) such that the second pillars 24 extend in the up-and-down direction. The third pillars 26 are provided in front of the fourth pillars 28 and behind the second pillars 24 such that the third pillars 26 extend in the up-and-down direction.

Figure 2:
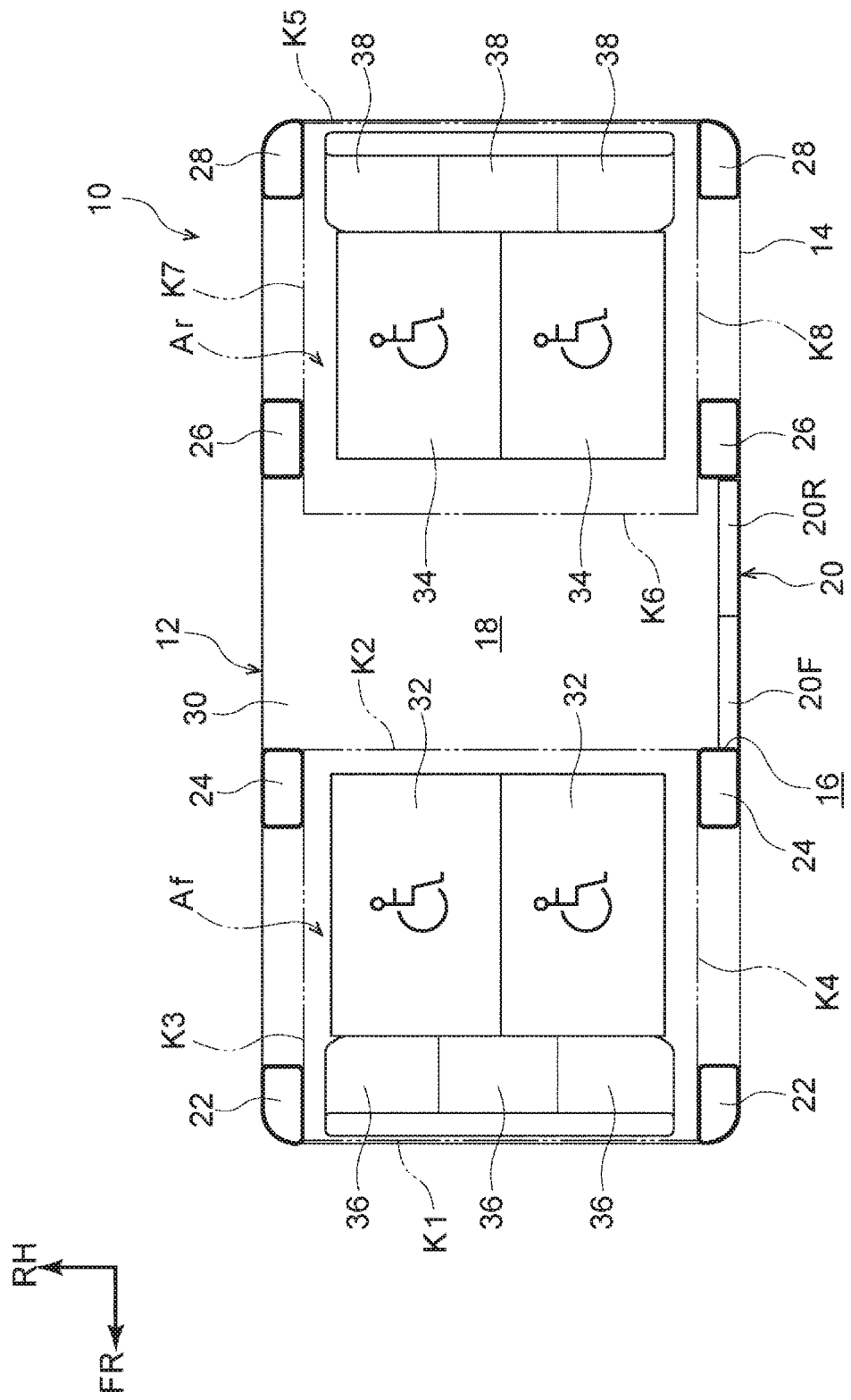
FIG. 2 is a plan view illustrating the inside of the bus according to the present embodiment.

As illustrated in FIG. 2, in a plan sectional view, the right and left first pillars 22 are each formed generally in a rectangular closed sectional shape in which its longitudinal direction is along the front-and-rear direction and a part on the outer side in the vehicle width direction and the front side is formed in an arch shape. Similarly, in a plan sectional view, the right and left fourth pillars 28 are each formed generally in a rectangular closed sectional shape in which its longitudinal direction is along the front-and-rear direction and a part on the outer side in the vehicle width direction and the rear side is formed in an arch shape. Further, in a plan sectional view, the right and left second pillars 24 and the right and left third pillars 26 are each formed generally in a rectangular closed sectional shape the longitudinal direction of which is along the front-and-rear direction.

Further, as illustrated in FIGS. 1, 2, the bus 10 includes an entrance door 20 configured to open and close a doorway 16 provided on a left side wall (one side wall) 14 of the vehicle body 12 and between the second pillar 24 and the third pillar 26. The entrance door 20 is configured to be dividable at a central part in the front-and-rear direction by sliding a front door 20F and a rear door 20R forward and rearward, respectively, so as to open the doorway 16.

Note that, as illustrated in FIG. 1, in a side view, a distance D1 in the front-and-rear direction between the second pillar 24 and the third pillar 26 is wider than a maximum distance D2 in the front-and-rear direction between the first pillar 22 and the second pillar 24 and a maximum distance D3 in the front-and-rear direction between the third pillar 26 and the fourth pillar 28. That is, the width of the doorway 16 in the front-and-rear direction can be made relatively wide.

Further, as illustrated in FIG. 2, a front wheelchair space 32 and a rear wheelchair space 34 are set on the front side and the rear side, respectively, on a floor face 30 of a vehicle cabin 18 of the bus 10. The floor face 30 of the vehicle cabin 18 as used herein is a top face of a floor carpet laid on a floor panel (not shown), and two rectangular frames with their longitudinal direction being along the front-and-rear direction are drawn along the right-and-left direction on each of the front side and the rear side on the top face of the floor carpet.

Regions surrounded by respective frames on the front side each serve as the front wheelchair space 32, and regions surrounded by respective frames on the rear side each serve as the rear wheelchair space 34. Note that a wheelchair mark is drawn in a generally central part of each of the front wheelchair spaces 32 and the rear wheelchair spaces 34, so that it can be recognized at a glance that those spaces are boarding positions for wheelchair occupants P1 (see FIGS. 3, 4).

Further, in a plan view, each of the front wheelchair spaces 32 is provided inside a high-strength region Af (see FIG. 2) of the vehicle cabin 18, the high-strength region Af being surrounded by the right and left first pillars 22 and the right and left second pillars 24. Similarly, in a plan view, each of the rear wheelchair spaces 34 is provided inside a high-strength region Ar (see FIG. 2) of the vehicle cabin 18, the high-strength region Ar being surrounded by the right and left third pillars 26 and the right and left fourth pillars 28. The high-strength region Af is also called a first region Af, and the high-strength region Ar is also called a second region Ar.

The first region Af is a rectangular region surrounded by a virtual straight line K1, a virtual straight line K2, a virtual straight line K3, and a virtual straight line K4. The virtual straight line K1 connects respective corners of the right and left first pillars 22, the corners being on the front side and the inner side in the vehicle width direction. The virtual straight line K2 connects respective corners of the right and left second pillars 24, the corners being on the rear side and the inner side in the vehicle width direction. The virtual straight line K3 connects a corner of the right first pillar 22, the corner being on the rear side and the inner side in the vehicle width direction, to a corner of the right second pillar 24, the corner being on the front side and the inner side in the vehicle width direction. The virtual straight line K4 connects a corner of the left first pillar 22, the corner being on the rear side and the inner side in the vehicle width direction, to a corner of the left second pillar 24, the corner being on the front side and the inner side in the vehicle width direction.

The second region Ar is a rectangular region surrounded by a virtual straight line K5, a virtual straight line K6, a virtual straight line K7, and a virtual straight line K8. The virtual straight line K5 connects respective corners of the right and left fourth pillars 28, the corners being on the rear side and the inner side in the vehicle width direction. The virtual straight line K6 connects respective corners of the right and left third pillars 26, the corners being on the front side and the inner side in the vehicle width direction. The virtual straight line K7 connects a corner of the right third pillar 26, the corner being on the rear side and the inner side in the vehicle width direction, to a corner of the right fourth pillar 28, the corner being on the front side and the inner side in the vehicle width direction. The virtual straight line K8 connects a corner of the left third pillar 26, the corner being on the rear side and the inner side in the vehicle width direction, to a corner of the left fourth pillar 28, the corner being on the front side and the inner side in the vehicle width direction.

Figure 3:
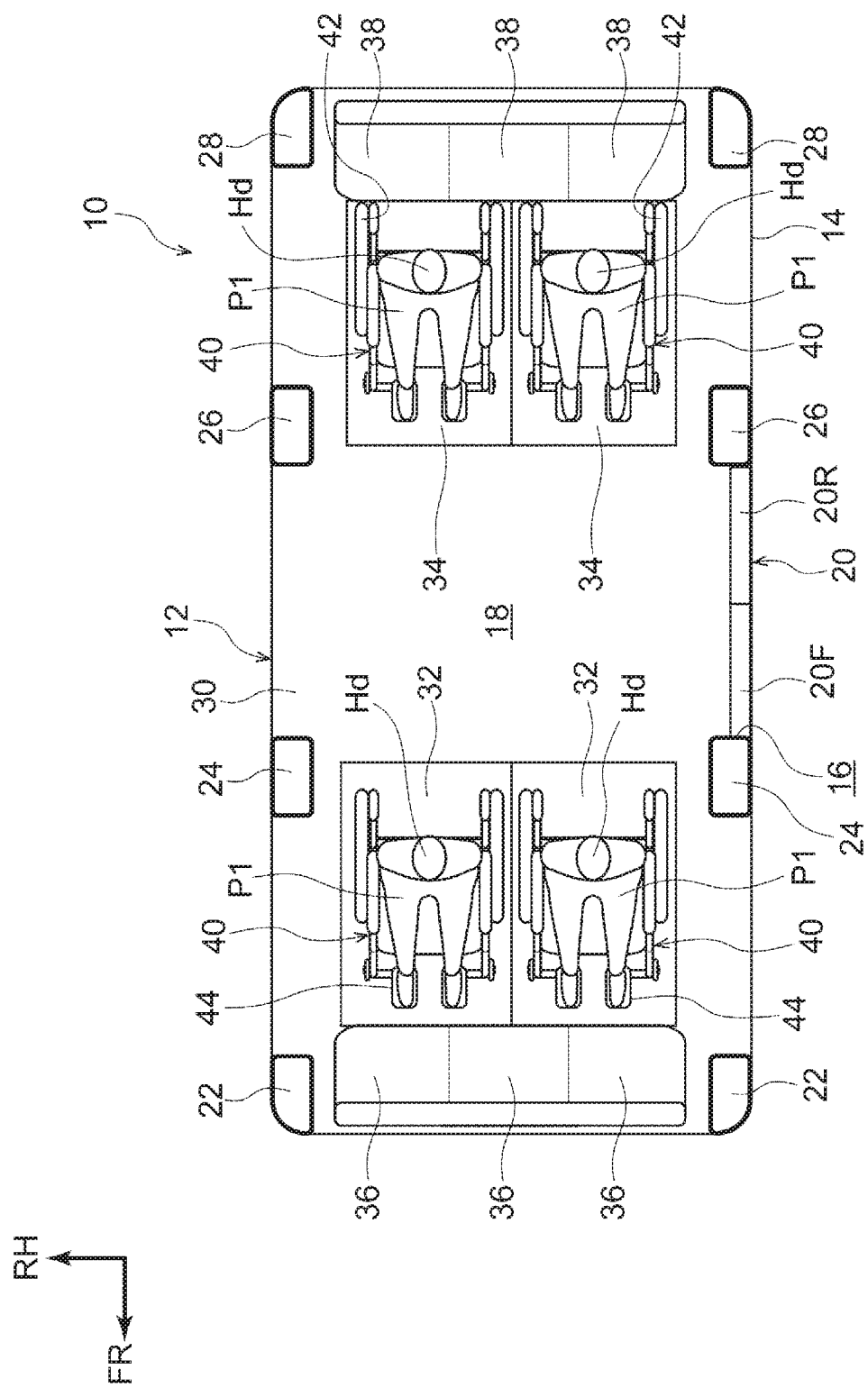
FIG. 3 is a plan view illustrating a case where two wheelchair occupants are seated on each of the front side and the rear side inside the bus according to the present embodiment in a forward facing posture.
Figure 4:
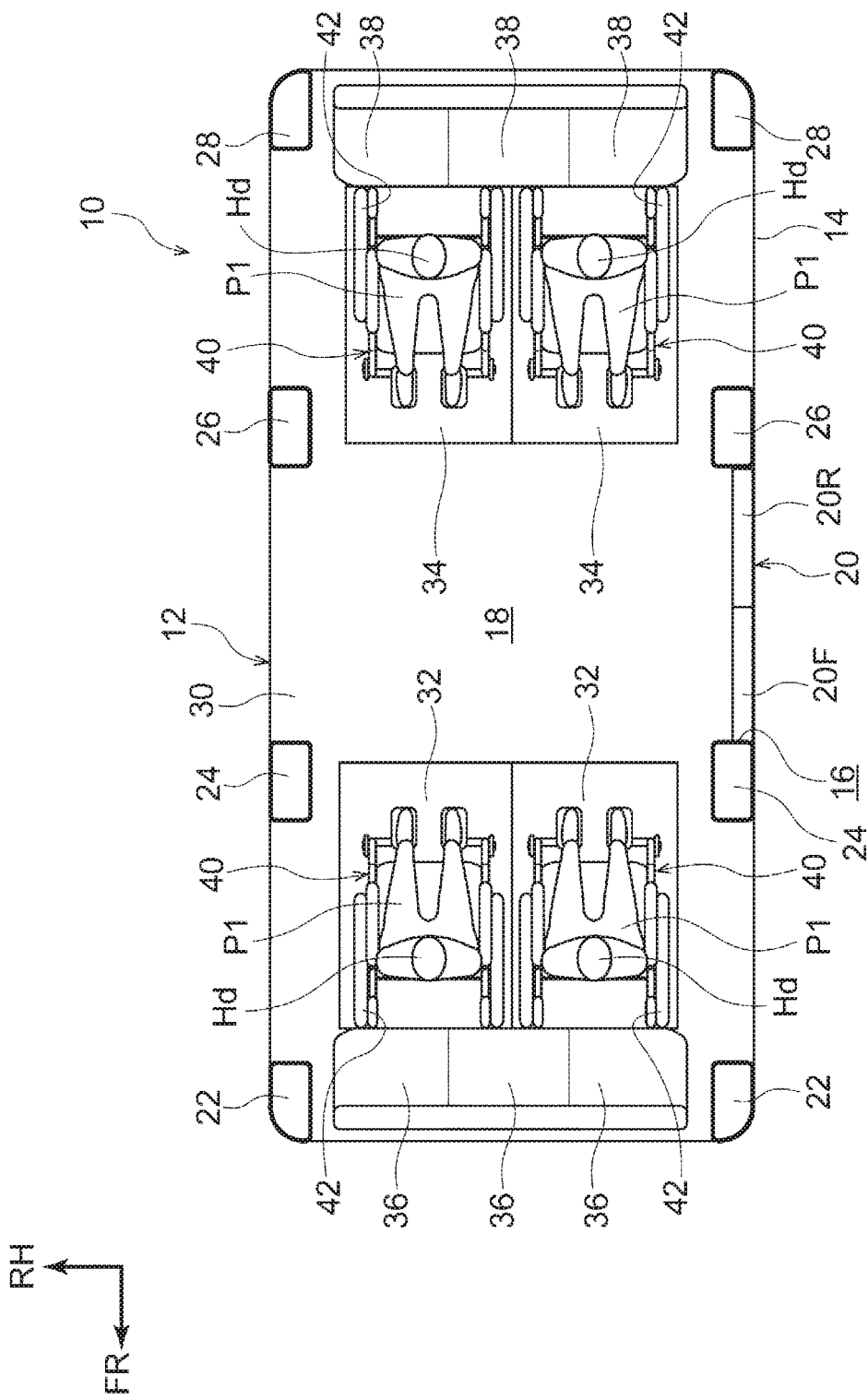
FIG. 4 is a plan view illustrating a case where two wheelchair occupants on the front side are seated in a rearward facing posture and two wheelchair occupants on the rear side are seated in a forward facing posture inside the bus according to the present embodiment.

Accordingly, as illustrated in FIGS. 3, 4, at least a head Hd (and in some embodiments, the upper body) of the wheelchair occupant P1 seated in a forward facing posture or a rearward facing posture and fixed (positioned) to the front wheelchair space 32 is placed within the high-strength region Af. Similarly, at least the head Hd (and in some embodiments, the upper body) of the wheelchair occupant P1 seated in a forward facing posture and fixed (positioned) to the rear wheelchair space 34 is placed within the high-strength region Ar. Note that the size of each of the front wheelchair spaces 32 and the rear wheelchair spaces 34 is, for example, such that the length in the vehicle width direction is 0.8 m, and the length in the front-and-rear direction is 1.2 m.

Further, as illustrated in FIGS. 2 to 4, on a front wall side of the vehicle cabin 18, a plurality of (e.g., three) front seats 36 on which an occupant (not shown) except the wheelchair occupant P1 is to be seated in a semi-upright posture is provided integrally along the vehicle width direction. On a rear wall side of the vehicle cabin 18, a plurality of (e.g., three) rear seats 38 on which an occupant P2 (see FIG. 5A) except the wheelchair occupant P1 is to be seated in a semi-upright posture is provided integrally along the vehicle width direction.

Figure 5B:
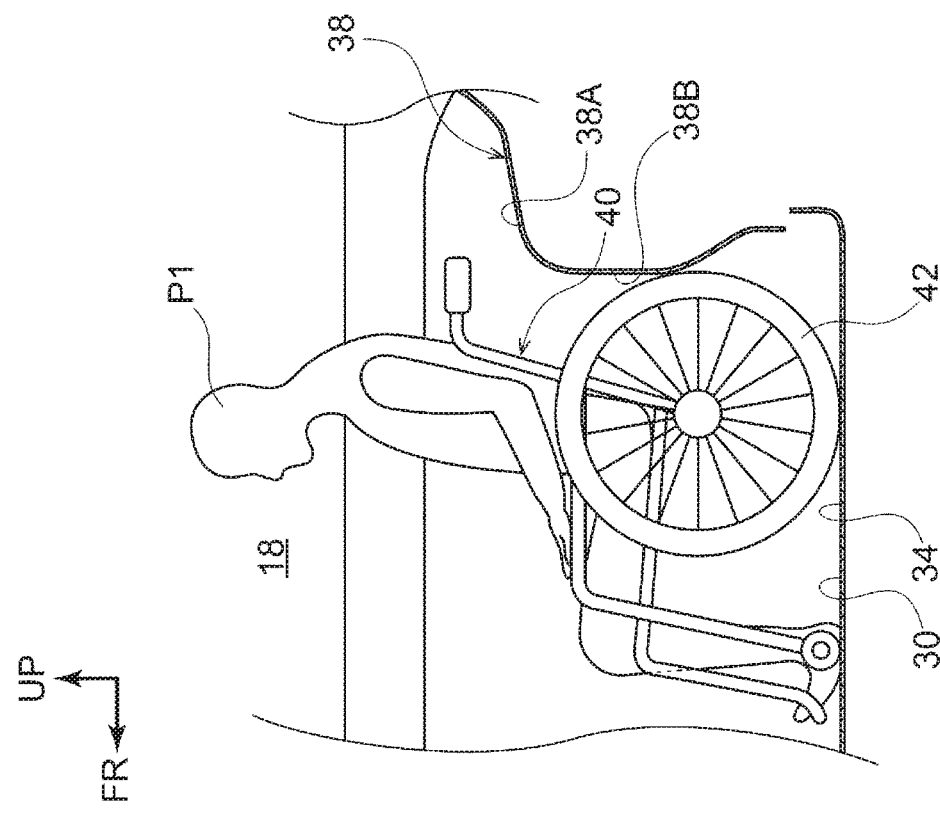
FIG. 5B is a side view illustrating a state where a wheelchair of a wheelchair occupant on the but according to the present embodiment is fixed by a part of the rear seat.
Figure 5A:
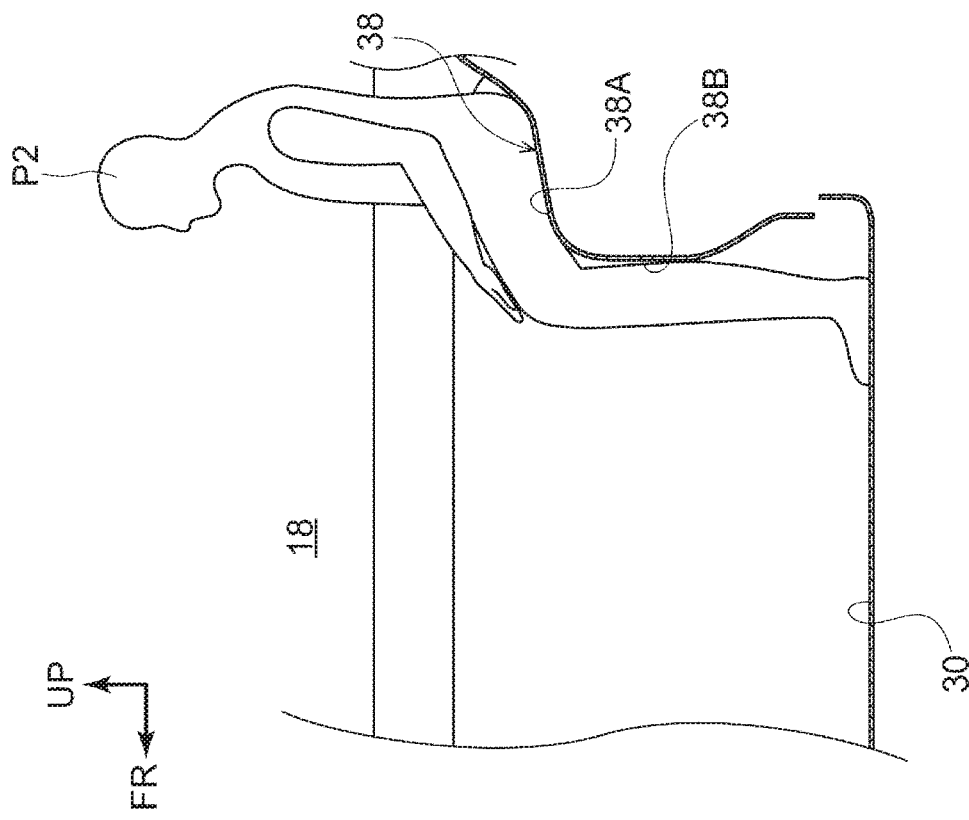
FIG. 5A is a side view illustrating a rear seat on which an occupant on the bus according to the present embodiment is seated in a semi-upright posture.

Since the front seats 36 and the rear seats 38 have the same configuration, the following mainly describes the rear seats 38 illustrated in FIG. 5A and FIG. 5B as an example. As illustrated in FIG. 5A and FIG. 5B, the rear seat 38 includes a seating face 38A on which the occupant P2 is seated, and a flat-shaped positioning portion 38B integrally extending downward from a front end portion of the seating face 38A.

When a part of (e.g., a pair of right and left main wheels 42) of the wheelchair 40 on which the wheelchair occupant P1 is seated is brought into contact with the positioning portion 38B, the wheelchair 40 is placed in a state where the wheelchair 40 is positioned (fixed) in the rear wheelchair space 34 (see FIG. 5B). Note that, although not illustrated herein, this also applies to a case where the wheelchair occupant P1 is seated in the front wheelchair space 32 in a rearward facing posture.

That is, when a part of (e.g., the right and left main wheels 42) of the wheelchair 40 on which the wheelchair occupant P1 is seated is brought into contact with a positioning portion (not shown) of the front seat 36, the wheelchair 40 is placed in a state where the wheelchair 40 is positioned (fixed) in the front wheelchair space 32. Note that, in a case where the wheelchair occupant P1 is seated in the front wheelchair space 32 in a forward facing posture, a part of the wheelchair 40, e.g., a pair of right and left foot supports 44 or the like, should be brought into contact with the positioning portion of the front seat 36. In FIG. 3, the right and left foot supports 44 are not brought into contact with the positioning portion of the front seat 36.

Next will be described operations in the bus 10 configured as described above.

As illustrated in FIG. 2, the front wheelchair space 32 set on the floor face 30 is provided within the high-strength region Af of the vehicle cabin 18, the high-strength region Af being surrounded by the right and left first pillars 22 and the right and left second pillars 24. Similarly, the rear wheelchair space 34 set on the floor face 30 is provided within the high-strength region Ar of the vehicle cabin 18, the high-strength region Ar being surrounded by the right and left third pillars 26 and the right and left fourth pillars 28.

As illustrated in FIG. 3, in a plan view, at least the heads Hd (and in some embodiments, the upper bodies) of the wheelchair occupants P1 seated in a forward facing posture in the front wheelchair space 32 and the rear wheelchair space 34 are placed within the high-strength regions Af, Ar, respectively.

Here, as illustrated in FIG. 6, when another vehicle 50 causes a side collision such that the vehicle 50 collides with a left side wall 14 of the bus 10, e.g., the entrance door 20, diagonally from the left rear side, the entrance door 20 largely deforms inward in the vehicle cabin 18 because the entrance door 20 is provided between the second pillar 24 and the third pillar 26 (a pillar cannot be set in the doorway 16 where the entrance door 20 is provided).

However, as described above, at least the head Hd of the wheelchair occupant P1 seated in the front wheelchair space 32 is placed within the high-strength region Af surrounded by the right and left first pillars 22 and the right and left second pillars 24. Also, at least the head Hd of the wheelchair occupant P1 seated in the rear wheelchair space 34 is placed within the high-strength region Ar surrounded by the right and left third pillars 26 and the right and left fourth pillars 28.

Accordingly, the wheelchair occupants P1 seated in the front wheelchair space 32 and the rear wheelchair space 34 can be hardly affected by the deformation of the vehicle body 12 (the entrance door 20) at the time of the side collision. That is, even when the bus 10 has a side collision with the vehicle 50, the wheelchair occupants P1 on the bus 10 can be protected.

Besides, as illustrated in FIG. 5B, in terms of the wheelchair occupant P1 seated in the rear wheelchair space 34 in a forward facing posture, the main wheels 42 of the wheelchair 40 are brought into contact with the positioning portion 38B of the rear seat 38 provided on the rear wall side of the vehicle cabin 18. That is, the position, in the front-and-rear direction, of the wheelchair 40 of the wheelchair occupant P1 seated in the rear wheelchair space 34 in a forward facing posture is positioned (fixed) by the rear seat 38. Further, since the rear seat 38 is a seat on which an occupant is to be seated in a semi-upright posture, the length of the rear seat 38 in the front-and-rear direction is short.

Accordingly, at least the head Hd of the wheelchair occupant P1 seated in the rear wheelchair space 34 in a forward facing posture can be easily placed within the high-strength region Ar surrounded by the right and left third pillars 26 and the right and left fourth pillars 28. Note that, as illustrated in FIG. 4, this also applies to the wheelchair occupant P1 seated in the front wheelchair space 32 in a rearward facing posture.

More specifically, as illustrated in FIG. 4, in terms of the wheelchair occupant P1 seated in the front wheelchair space 32 in a rearward facing posture, the main wheels 42 of the wheelchair 40 are brought into contact with the positioning portion of the front seat 36 provided on the front wall side of the vehicle cabin 18. That is, the position, in the front-and-rear direction, of the wheelchair 40 of the wheelchair occupant P1 seated in the front wheelchair space 32 in a rearward facing posture is positioned (fixed) by the front seat 36.

Accordingly, in comparison with the wheelchair occupant P1 seated in the front wheelchair space 32 in a forward facing posture, at least the head Hd of the wheelchair occupant P1 seated in the front wheelchair space 32 in a rearward facing posture can be easily placed within the high-strength region Af surrounded by the right and left first pillars 22 and the right and left second pillars 24. Note that, when the wheelchair occupant P1 is seated in the front wheelchair space 32 in a rearward facing posture, the following effect can be obtained.

That is, at the time of getting off the bus 10 from the doorway 16 provided in the bus 10, the wheelchair occupant P1 seated in the front wheelchair space 32 in a rearward facing posture as well as the wheelchair occupant P1 seated in the rear wheelchair space 34 in a forward facing posture can operate the wheelchair 40 in a forward facing posture. This can accordingly improve convenience of the bus 10 for the wheelchair occupant P1.

Besides, in a side view, the distance D1 in the front-and-rear direction between the second pillar 24 and the third pillar 26 is wider than the maximum distance D2 in the front-and-rear direction between the first pillar 22 and the second pillar 24. Also, the distance D1 in the front-and-rear direction between the second pillar 24 and the third pillar 26 is wider than the maximum distance D3 in the front-and-rear direction between the third pillar 26 and the fourth pillar 28. That is, the width, in the front-and-rear direction, of the doorway 16 provided between the second pillar 24 and the third pillar 26 is relatively wide. Accordingly, the wheelchair occupant P1 easily gets on and off the bus 10, so that a burden to the wheelchair occupant P1 at the time of getting on and off the bus 10 can be reduced.

Reversely speaking, in a side view, the maximum distance D2 in the front-and-rear direction between the first pillar 22 and the second pillar 24 is narrower than the distance D1 in the front-and-rear direction between the second pillar 24 and the third pillar 26, and the maximum distance D3 in the front-and-rear direction between the third pillar 26 and the fourth pillar 28 is narrower than the distance D1 in the front-and-rear direction between the second pillar 24 and the third pillar 26. Accordingly, the region Af, of the vehicle cabin 18, that is surrounded by the right and left first pillars 22 and the right and left second pillars 24 and the region Ar, of the vehicle cabin 18, that is surrounded by the right and left third pillars 26 and the right and left fourth pillars 28 can be made regions having a higher strength.

The bus (shared vehicle) 10 according to the present embodiment has been described above with reference to the drawings. However, the bus (shared vehicle) 10 according to the present embodiment is not limited to those illustrated in the figures, and its design is modifiable appropriately within a range that does not deviate from the gist of the present disclosure. For example, the front seats 36 and the rear seats 38 may be foldable seats.

That is, the bus 10 may be configured such that, by folding the front seats 36 and the rear seats 38, the front wheelchair spaces 32 and the rear wheelchair spaces 34 in which the wheelchair occupants P1 are to be seated are secured, respectively. Note that, in this case, the positioning portions with which the main wheels 42 of the wheelchairs 40 are brought into contact should be set appropriately in the folded front seats 36 and the folded rear seats 38.

Further, the configuration in which the wheelchairs 40 are fixed (positioned) in the front wheelchair space 32 and the rear wheelchair space 34 is not limited to the positioning portion 38B and so on illustrated in the figures. For example, the wheelchairs 40 may be fixed to the front wheelchair spaces 32 and the rear wheelchair spaces 34 by seat belt devices (not shown) or the like provided on the front wall side and the rear wall side of the vehicle cabin 18.

Further, although not illustrated herein, some buses 10 may be configured such that a plurality of foldable seats are provided along the front-and-rear direction between the second pillar 24 and the third pillar 26 on a right side wall side. In this case, by folding the foldable seats, the wheelchair occupant P1 can easily move to the right front wheelchair space 32 and to the right rear wheelchair space 34.

Further, the present embodiment deals with an aspect in which the wheelchair occupants P1 are seated in the front wheelchair spaces 32 and the rear wheelchair spaces 34 (two wheelchair occupants P1 are seated on each of the front side and the rear side). However, the present embodiment is not limited to this aspect. For example, as illustrated in FIG. 7, even in an aspect in which the wheelchair occupants P1 are seated in the right front wheelchair space 32 and the right rear wheelchair space 34 (one wheelchair occupant P1 is seated on each of the front side and the rear side), the wheelchair occupants P1 are protected similarly to the above. Further, even in a case where the bus 10 has a side collision such that the vehicle 50 collides with the right side wall of the bus 10, the wheelchair occupants P1 are protected similarly to the above.

Further, in the present embodiment, the front wheelchair spaces 32 and the rear wheelchair spaces 34 are set on the front side and the rear side, respectively, on the floor face 30 of the vehicle cabin 18 of the bus 10. However, wheelchair spaces may be set on either of the front side and the rear side on the floor face 30 of the vehicle cabin 18 of the bus 10. For example, the front wheelchair spaces 32 may be set only on the front side on the floor face 30 of the vehicle cabin 18 of the bus 10. Alternatively, the rear wheelchair spaces 34 may be set only on the rear side on the floor face 30 of the vehicle cabin 18 of the bus 10.

What is claimed is:

1. A shared vehicle comprising:
a pair of right and left first pillars provided in a front portion of a vehicle body in a front-and-rear direction of the vehicle body, the first pillars extending in an up-and-down direction of the vehicle body;
a pair of right and left fourth pillars provided in a rear portion of the vehicle body in the front-and-rear direction of the vehicle body, the fourth pillars extending in the up-and-down direction of the vehicle body;
a pair of right and left second pillars provided behind the first pillars in the front-and-rear direction of the vehicle body and in front of the fourth pillars in the front-and-rear direction of the vehicle body, the second pillars extending in the up-and-down direction of the vehicle body;
a pair of right and left third pillars provided in front of the fourth pillars in the front-and-rear direction of the vehicle body and behind the second pillars in the front-and-rear direction of the vehicle body, the third pillars extending in the up-and-down direction of the vehicle body;
an entrance door provided on one side wall of the vehicle body and placed between the second pillar and the third pillar; and
a front wheelchair space on a floor face of a vehicle cabin, the front wheelchair space being provided such that at least a head of a wheelchair occupant is placed within a first region of the vehicle cabin in a plan view, the first region being surrounded by the right and left first pillars and the right and left second pillars, and/or a rear wheelchair space on the floor face of the vehicle cabin, the rear wheelchair space being provided such that at least the head of the wheelchair occupant is placed within a second region of the vehicle cabin in a plan view, the second region being surrounded by the right and left third pillars and the right and left fourth pillars.

2. The shared vehicle according to claim 1, wherein the shared vehicle includes:
the front wheelchair space; and
the rear wheelchair space.

3. The shared vehicle according to claim 1, wherein:
a distance in the front-and-rear direction of the vehicle body between the second pillar and the third pillar is wider than a distance in the front-and-rear direction of the vehicle body between the first pillar and the second pillar in a side view; and
the distance in the front-and-rear direction of the vehicle body between the second pillar and the third pillar is wider than a distance in the front-and-rear direction of the vehicle body between the third pillar and the fourth pillar in a side view.

4. The shared vehicle according to claim 1, wherein a wheelchair of the wheelchair occupant seated in the rear wheelchair space in a forward facing posture is positioned against a rear wall side of the vehicle cabin.

5. The shared vehicle according to claim 1, wherein a wheelchair of the wheelchair occupant seated in the front wheelchair space in a rearward facing posture is positioned against a front wall side of the vehicle cabin.

6. The shared vehicle according to claim 1, wherein a wheelchair of the wheelchair occupant seated in the front wheelchair space in a forward facing posture is positioned against a front wall side of the vehicle cabin.

7. The shared vehicle according to claim 4, further comprising a seat provided on a rear wall side of the vehicle cabin such that an occupant is seated on the seat in a semi-upright posture, wherein the wheelchair of the wheelchair occupant seated in the rear wheelchair space in a forward facing posture is positioned against the seat.

8. The shared vehicle according to claim 5, further comprising a seat provided on a front wall side of the vehicle cabin such that an occupant is seated on the seat in a semi-upright posture, wherein the wheelchair of the wheelchair occupant seated in the front wheelchair space in a rearward facing posture is positioned against the seat.

9. The shared vehicle according to claim 6, further comprising a seat provided on a front wall side of the vehicle cabin such that an occupant is seated on the seat in a semi-upright posture, wherein the wheelchair of the wheelchair occupant seated in the front wheelchair space in a forward facing posture is positioned against the seat.

10. The shared vehicle according to claim 7, wherein:
the seat includes a seating face on which the occupant is seated, and a positioning portion; and
the positioning portion is configured such that, when a part of the wheelchair is brought into contact with the positioning portion, the wheelchair is placed in the rear wheelchair space.

11. The shared vehicle according to claim 8, wherein:
the seat includes a seating face on which the occupant is seated, and a positioning portion; and
the positioning portion is configured such that, when a part of the wheelchair is brought into contact with the positioning portion, the wheelchair is placed in the front wheelchair space.

12. The shared vehicle according to claim 9, wherein:
the seat includes a seating face on which the occupant is seated, and a positioning portion; and
the positioning portion is configured such that, when a part of the wheelchair is brought into contact with the positioning portion, the wheelchair is placed in the front wheelchair space.

13. The shared vehicle according to claim 10, wherein the positioning portion is flat-shaped and integrally extends downward from a front end portion of the seating face.

14. The shared vehicle according to claim 11, wherein the positioning portion is flat-shaped and integrally extends downward from a front end portion of the seating face.

15. The shared vehicle according to claim 12, wherein the positioning portion is flat-shaped and integrally extends downward from a front end portion of the seating face.

* * * * *